US011237067B2

(12) United States Patent
Norris et al.

(10) Patent No.: US 11,237,067 B2
(45) Date of Patent: Feb. 1, 2022

(54) UNCERTAINTY DIAGNOSIS FOR TEMPERATURE DETECTION SYSTEMS

(71) Applicant: Kidde Technologies, Inc., Wilson, NC (US)

(72) Inventors: Robert J. Norris, Zebulon, NC (US); Tadd F. Herron, Chocowinity, NC (US); Scott Kenneth Newlin, Willow Spring, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 259 days.

(21) Appl. No.: 16/545,041

(22) Filed: Aug. 20, 2019

(65) Prior Publication Data
US 2021/0055169 A1 Feb. 25, 2021

(51) Int. Cl.
*G01K 7/16* (2006.01)
*G01K 15/00* (2006.01)
*B64D 45/00* (2006.01)

(52) U.S. Cl.
CPC ............ *G01K 15/007* (2013.01); *G01K 7/16* (2013.01); *B64D 45/00* (2013.01)

(58) Field of Classification Search
CPC .. G01J 5/04; G01K 13/00; G01K 1/14; G01K 7/22; G01K 13/02; G01K 7/021; G01K 3/005; G01K 1/026; G01K 7/16; G01K 15/007; G01K 2201/02; B64D 45/00; A62C 3/08
See application file for complete search history.

(56) References Cited

U.S. PATENT DOCUMENTS

| | | | | |
|---|---|---|---|---|
| 3,775,745 A * | 11/1973 | Kelley | .................... | G01K 7/021 340/449 |
| 3,826,981 A * | 7/1974 | Ross | ...................... | G01R 27/02 324/72.5 |
| 3,832,668 A * | 8/1974 | Berman | ................... | G01K 7/22 338/22 SD |
| 3,881,170 A * | 4/1975 | Hosaka | ............... | B60C 23/0498 340/448 |

(Continued)

FOREIGN PATENT DOCUMENTS

CN 204760671 U * 11/2015

OTHER PUBLICATIONS

European Search Report Issued in European Application No. 19212816.3 dated Jul. 13, 2020; 8 Pages.

*Primary Examiner* — Gail Kaplan Verbitsky
(74) *Attorney, Agent, or Firm* — Cantor Colburn LLP

(57) ABSTRACT

Disclosed is a system for detecting uncertainty in temperature detection systems. The system includes a temperature sensor including a ground sheath and a central conductor surrounded by the ground sheath, the ground sheath and the central conductor being electrically coupled to one another through a temperature dependent resistive element. The system includes a controller connected to the temperature sensor and adapted to detect an electrical parameter of the temperature dependent resistive element, the controller operable upon execution to output an uncertainty indication when the electrical parameter of the temperature dependent resistive element is not within an expected value range based on an aircraft status indication, a historical value of the electrical parameter, and the electrical parameter.

13 Claims, 3 Drawing Sheets

(56) References Cited

U.S. PATENT DOCUMENTS

| | | | | |
|---|---|---|---|---|
| 4,477,715 A | * | 10/1984 | Bell | H05B 3/141 |
| | | | | 219/205 |
| 4,591,576 A | * | 5/1986 | Chiang | B01J 29/084 |
| | | | | 502/65 |
| 5,167,153 A | * | 12/1992 | McQueen | G01F 1/684 |
| | | | | 338/22 R |
| 5,184,605 A | * | 2/1993 | Grzeszykowski | |
| | | | | A61H 23/0245 |
| | | | | 601/2 |
| 8,473,176 B2 | | 6/2013 | Youngquist et al. | |
| 9,127,597 B2 | | 9/2015 | Masiello et al. | |
| 9,233,763 B1 | | 1/2016 | Chen | |
| 9,725,186 B2 | | 8/2017 | O'Dell et al. | |
| 10,871,403 B1 | * | 12/2020 | Simpson | G01K 7/22 |
| 11,016,117 B2 | * | 5/2021 | Gordon | G01P 5/165 |
| 2009/0306839 A1 | * | 12/2009 | Youngquist | G01K 15/00 |
| | | | | 701/14 |
| 2011/0102183 A1 | | 5/2011 | Tenchio | |
| 2014/0358455 A1 | | 12/2014 | Rogers | |
| 2016/0370236 A1 | * | 12/2016 | Schwie | G01K 15/007 |
| 2018/0137765 A1 | * | 5/2018 | Sindlinger | G08G 5/0052 |
| 2019/0049953 A1 | * | 2/2019 | Dong | G05D 1/0055 |
| 2019/0283728 A1 | * | 9/2019 | Jimenez | B60T 17/221 |
| 2019/0316981 A1 | * | 10/2019 | Brucker | G01L 9/0002 |
| 2020/0180790 A1 | * | 6/2020 | Ramaswamy | G08G 5/0004 |
| 2020/0189764 A1 | * | 6/2020 | Esimai | G08G 5/0021 |
| 2020/0231280 A1 | * | 7/2020 | Srivastava | B64C 39/024 |
| 2021/0024200 A1 | * | 1/2021 | Rogers | H04B 10/2537 |
| 2021/0156747 A1 | * | 5/2021 | Skifton | G01K 7/06 |

\* cited by examiner

UNCERTAINTY DIAGNOSIS FOR TEMPERATURE DETECTION SYSTEMS

BACKGROUND

This disclosure relates to the art of uncertainty diagnosis in temperature detection systems.

Temperature and overheat sensing systems may include thermistors, switches, and other instrumentation to determine temperature and overheat situations. The instrumentation may be connected to controllers using instrumentation loops. While systems generally operate normally, early detection of uncertainty may increase system robustness.

BRIEF DESCRIPTION

Disclosed is a system for detecting uncertainty in temperature detection systems. The system includes a temperature sensor including a ground sheath and a central conductor surrounded by the ground sheath, the ground sheath and the central conductor being electrically coupled to one another through a temperature dependent resistive element. The system includes a controller connected to the temperature sensor and adapted to detect an electrical parameter of the temperature dependent resistive element, the controller operable upon execution to output an uncertainty indication when the electrical parameter of the temperature dependent resistive element is not within an expected value range based on an aircraft status indication, a historical value of the electrical parameter, and the electrical parameter.

In addition to one or more of the features described above, or as an alternative, further embodiments may include that the historical value defines the expected value range based on the aircraft status indication.

In addition to one or more of the features described above, or as an alternative, further embodiments may include that the controller is operable upon execution to output the uncertainty indication when the electrical parameter is outside of the expected value range associated with the aircraft status indication.

In addition to one or more of the features described above, or as an alternative, further embodiments may include that the aircraft status indication includes a geographical location associated with the temperature sensor.

In addition to one or more of the features described above, or as an alternative, further embodiments may include that the aircraft status indication includes an altitude associated with a geographical location.

In addition to one or more of the features described above, or as an alternative, further embodiments may include that the aircraft status indication includes weather associated with a geographical location.

In addition to one or more of the features described above, or as an alternative, further embodiments may include that the electrical parameter is resistance.

Also disclosed is a method for detecting uncertainty in temperature detection installations. The method includes receiving an electrical parameter associated with a temperature sensor. The method includes receiving an aircraft status indication. The method includes receiving a historical value of the electrical parameter associated with the aircraft status indication. The method includes outputting an uncertainty indication based on the electrical parameter, the aircraft status indication, and the historical value.

In addition to one or more of the features described above, or as an alternative, further embodiments may include that the historical value is an expected value range based on the aircraft status indication.

In addition to one or more of the features described above, or as an alternative, further embodiments may include that the expected value range has a lowest average magnitude when the aircraft status indication is an aircraft descent phase. The expected value range has a lower average magnitude greater than the lowest average magnitude when the aircraft status indication is an aircraft cruise phase. The expected value range has a greater average magnitude greater than the lower average magnitude when the aircraft status indication is an aircraft takeoff roll phase. The expected value range has a greatest average magnitude greater than the when the aircraft status indication is an aircraft initial climb phase.

In addition to one or more of the features described above, or as an alternative, further embodiments may include outputting the uncertainty indication is responsive to the electrical parameter being outside of the expected value range.

In addition to one or more of the features described above, or as an alternative, further embodiments may include that the aircraft status indication includes a geographical location of the temperature sensor.

In addition to one or more of the features described above, or as an alternative, further embodiments may include that the aircraft status indication includes an altitude associated with a geographical location.

In addition to one or more of the features described above, or as an alternative, further embodiments may include that the aircraft status indication includes weather associated with a geographical location.

In addition to one or more of the features described above, or as an alternative, further embodiments may include that the electrical parameter is resistance.

Also disclosed is a controller program product for use by a controller in providing uncertainty indication. The controller program product includes a digital storage device. The controller program product includes a controller logic program stored on the digital storage device in controller readable form. The controller logic program is operable upon execution by the controller to receive an electrical parameter from a temperature sensor and an aircraft status indication. The controller program product is operable to output the uncertainty indication based on a historical value of the electrical parameter associated with the aircraft status indication and the electrical parameter.

In addition to one or more of the features described above, or as an alternative, further embodiments may include that the historical value is an expected value range based on the aircraft status indication.

In addition to one or more of the features described above, or as an alternative, further embodiments may include that the expected value range has a lowest average magnitude when the aircraft status indication is an aircraft descent phase.

In addition to one or more of the features described above, or as an alternative, further embodiments may include that the expected value range has a lower average magnitude greater than the lowest average magnitude when the aircraft status indication is an aircraft cruise phase.

In addition to one or more of the features described above, or as an alternative, further embodiments may include that the expected value range has a greater average magnitude greater than the lower average magnitude when the aircraft status indication is an aircraft takeoff roll phase.

In addition to one or more of the features described above, or as an alternative, further embodiments may include that the expected value range has a greatest average greater than the when the aircraft status indication is an aircraft initial climb phase.

In addition to one or more of the features described above, or as an alternative, further embodiments may include outputting the uncertainty indication is responsive to the electrical parameter being outside of the expected value range.

In addition to one or more of the features described above, or as an alternative, further embodiments may include that the expected value range has a lowest average magnitude when the aircraft status indication is an aircraft descent phase.

In addition to one or more of the features described above, or as an alternative, further embodiments may include that the expected value range has a lower average magnitude greater than the lowest average magnitude when the aircraft status indication is an aircraft cruise phase.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Temperature detection systems may include various systems and apparatuses for determining environment temperatures. Such systems may include switches, temperature sensors, or other sensory inputs. Ground conduction between sensors and control systems may increase instrument uncertainty. Such uncertainty may be latent in that issues are not determined or remain dormant without diagnosis.

Figure 1:
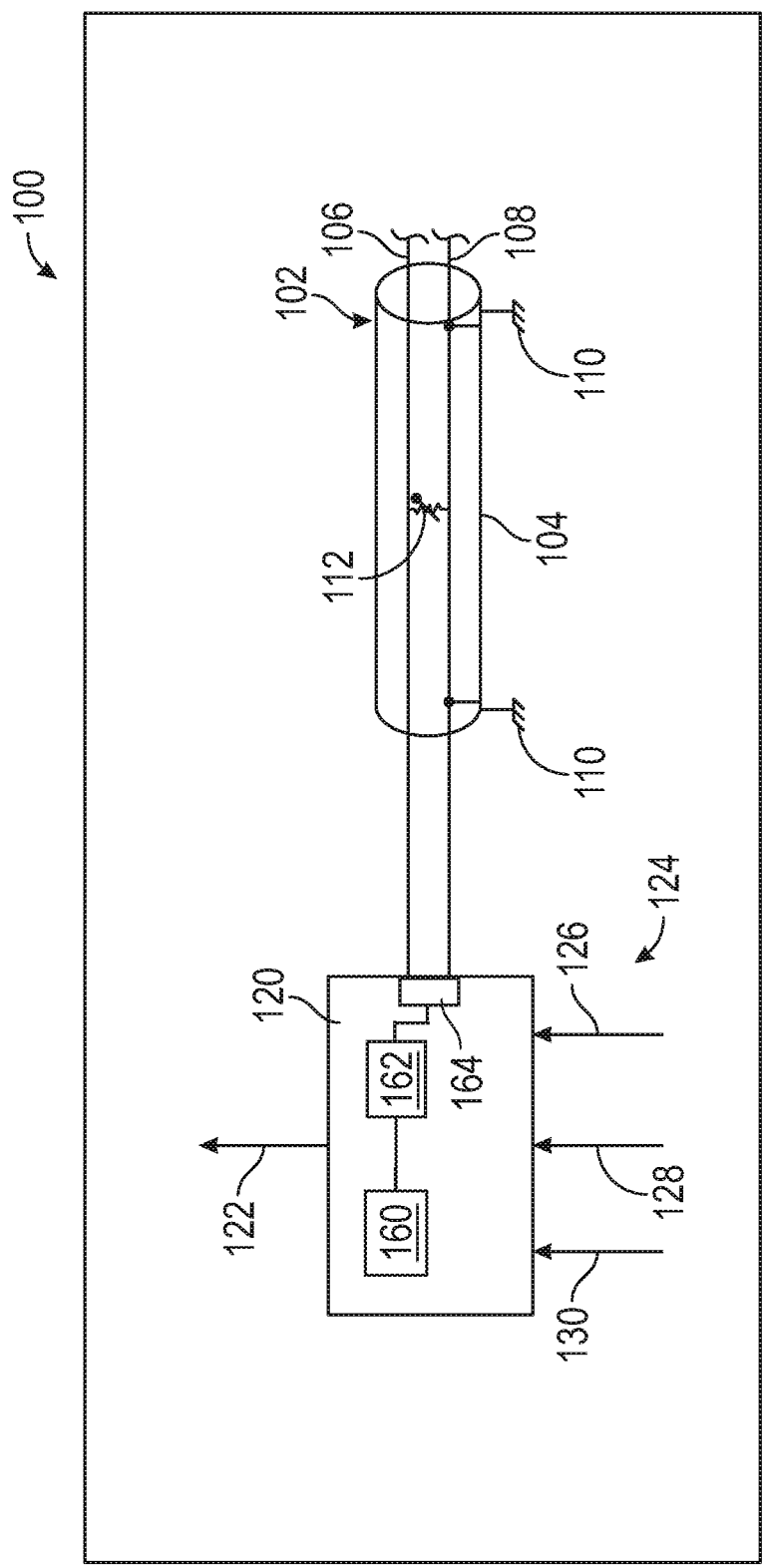
FIG. 1 illustrates an example temperature detection system of an aircraft.

Referring to FIG. 1, an aircraft 100 is shown. The aircraft 100 includes a temperature sensor 102. The temperature sensor 102 may be any type of temperature sensing device. The temperature sensor 102 includes a ground sheath 104. The ground sheath 104 may be electrically connected to ground connections 110. The ground connections 110 may be portions of a body of the aircraft 100. The ground sheath 104 may encase a central conductor 106. The central conductor 106 may be electrically conductive and attached to a controller 120. The temperature sensor 102 may include a central return 108. The central return 108 may be conductively connected with the ground sheath 104. The central conductor 106 may be conductively connected to the central return 108 by a temperature dependent resistive element 112. Those versed in the art will readily appreciate that the temperature dependent resistive element 112 may be a thermistor or other device employing any kind of temperature sensitive components and configurations.

The temperature sensor 102 is connected to controller 120 through the central conductor 106 and the central return 108, ground sheath 104, the ground connections 110, a body of the aircraft 100, or any other source of potential necessary to measure resistance of the temperature dependent resistive element 112. The controller 120 may include any combination of processors, field programmable gate arrays (FPGA), or application specific integrated circuits (ASIC). The controller 120 may include a digital storage device 160, volatile and non-volatile—but entirely non-transitory—operable to store machine instructions and the like as a controller program product in cooperation with the processors 162 and other processing mechanisms to receive, calculate, and control devices, as necessary. The processors 162 may be in communication with digital or analog input and output channels 164 configured to receive electrical parameters 132 (as shown in as an at least one example in FIG. 2) from the central conductor 106 and the central return 108. Machine instructions may be stored as a controller logic program (e.g., stored instructions, stored machine instructions, stored steps) in any language or representation, including—but not limited to—machine code, assembly instructions, C, C++, C#, PASCAL, COBAL, PYTHON, JAVA, and RUBY. It should be appreciated that any type of wired or wireless configuration is appreciated for any of the communications from the controller 120. Wireless protocols such as ZIG-BEE, WI-FI, BLUETOOTH, or any other implement may be used. Communications may be realized through any protocol or medium known or unknown.

The controller 120 may receive an electrical parameter or determine an electrical parameter 132 from the temperature sensor 102. The electrical parameter 132 may be resistance, voltage, current, capacitance, inductance, or any other electrical parameter 132 that characterizes the temperature associated with the temperature sensor 102. The controller 120 may receive any number of inputs, including an aircraft status indication 124. The aircraft status indication 124 may be any number or type of information associated with the aircraft 100.

As an example, the aircraft status indication 124 may be or include a geographical location 126 associated with the temperature sensor 102. The geographical location 126 may be a GPS location or any other designation of location or aircraft 100. The aircraft status indication 124 may be an altitude 128 associated with a geographical location 126. The aircraft status indication 124 may be weather 130 associated with a geographical location 126 or aircraft 100. That is, the aircraft status indication 124 may be an environmental or ambient temperature associated with the aircraft 100. The controller 120 may receive the electrical parameter 132 and the aircraft status indication 124 for comparison with a historical value of the electrical parameter 132 to output an uncertainty indication 122. The uncertainty indication 122 may be an indication of a grounded conductor associated with the temperature sensor 102.

Figure 2:
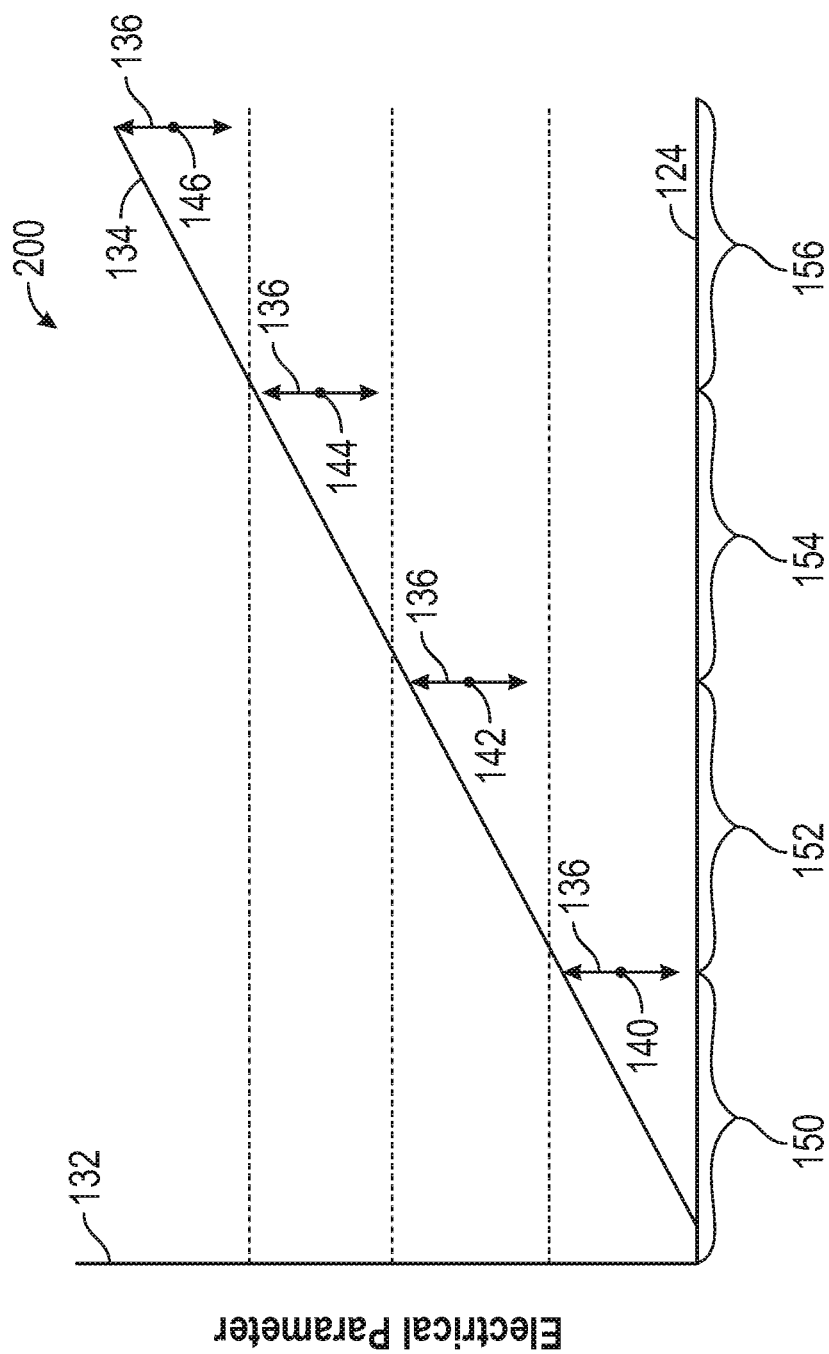
FIG. 2 illustrates a graph depicting aircraft status indications and temperature sensor temperature detection.

Referring to FIG. 2, a graph 200 depicts one of many examples for determining uncertainty of the temperature sensor 102. The electrical parameter 132 may be received by the controller 120. The controller 120 may also receive an aircraft status indication 124. The aircraft status indication 124 may be flight phases. The controller 120 may receive or store expected value ranges 136 associated with each of the flight phases. The expected value ranges 136 may be defined by trendline 134. Flight phases may be based on any number of factors including attitude, velocity, altitude, or other operational factors.

As one of many possible phases, the flight phases may include an aircraft descent phase 150. The aircraft descent phase 150 may be associated with the expected value range 136 having a lowest average magnitude 140. That is, acceptable values of the electrical parameter 132 having an expected value range 136 during the aircraft descent phase 150 may have a lowest average magnitude 140 when compared with other flight phases. The controller 120 may receive the aircraft status indication 124 and retrieve the expected value range 136 having the lowest average magnitude 140 as a historical value. As one of many possible configurations, the controller 120 may compare the aircraft descent phase 150 with the associated expected value range 136 with the electrical parameter 132 received by the temperature sensing device. In response the electrical parameter 132 being outside of the expected value range 136, the controller 120 may output the uncertainty indication 122.

As one of many possible phases, the flight phases may include an aircraft cruise phase 152. The aircraft cruise phase 152 may be associated with the expected value range 136 having a lower average magnitude 142. That is, acceptable values of the electrical parameter 132 having an expected value range 136 during the aircraft cruise phase 152 may have a lower average magnitude 142 when compared with other flight phases. The aircraft cruise phase 152 may have an average magnitude 142 that is greater than the lowest average magnitude 140. It should also be appreciated that the expected value range 136 associated with the aircraft cruise phase 152 may have a starting value greater than an ending value of the expected value range 136 associated with the aircraft descent phase 150. As another example of many possible values the expected value range 136 associated with the aircraft cruise phase 152 may have a starting value less than the ending value of the expected value range 136 associated with the aircraft descent phase 150 such that the two expected value ranges 136 overlap. In such a case, the lower average magnitude 142 associated with the aircraft cruise phase 152 may still be greater than the lowest average magnitude 140 associated with the aircraft descent phase 150.

As one of many possible phases, the flight phases may include an aircraft takeoff roll phase 154. The aircraft takeoff roll phase 154 may be associated with the expected value range 136 having a greater average magnitude 144. That is, acceptable values of the electrical parameter 132 having an expected value range 136 during the aircraft takeoff roll phase 154 may have a greater average magnitude 144 when compared with other flight phases. The aircraft takeoff roll phase 154 may have an average magnitude 144 that is greater than the lowest average magnitude 140 and the lower average magnitude 142. It should also be appreciated that the expected value range 136 associated with the aircraft takeoff roll phase 154 may have a starting value greater than an ending value of the expected value range 136 associated with the aircraft cruise phase 152. As another example of many possible values the expected value range 136 associated with the aircraft takeoff roll phase 154 may have a starting value less than the ending value of the expected value range 136 associated with the aircraft cruise phase 152 such that the two expected value ranges 136 overlap. In such a case, the greater average magnitude 144 associated with aircraft takeoff roll phase 154 may still be greater than the lower average magnitude 142 associated with the aircraft cruise phase 152.

As one of many possible phases, the flight phases may include an aircraft initial climb phase 156. The aircraft initial climb phase 156 may be associated with the expected value range 136 having a greatest average magnitude 146. That is, acceptable values of the electrical parameter 132 having an expected value range 136 during the aircraft initial climb phase 156 may have a greatest average magnitude 146 when compared with other flight phases. The aircraft initial climb phase 156 may have an average magnitude 146 that is greater than the lowest average magnitude 140, the lower average magnitude 142, and the greater average magnitude 144. It should also be appreciated that the expected value range 136 associated with the aircraft initial climb phase 156 may have a starting value greater than an ending value of the expected value range 136 associated with the aircraft takeoff roll phase 154. As another example of many possible values the expected value range 136 associated with the aircraft initial climb phase 156 may have a starting value less than the ending value of the expected value range 136 associated with the aircraft takeoff roll phase 154 such that the two expected value ranges 136 overlap. In such a case, the greatest average magnitude 146 associated with aircraft initial climb phase 156 may still be greater than the greater average magnitude 144 associated with the aircraft takeoff roll phase 154.

Those with skill in the art will readily appreciate that the expected value ranges 136 may overlap or not overlap at varying rates and that any type of statistical network or system may be used to predict expected values of the electrical parameter 132 and the expected value ranges 136 listed such that they are correlated or associated with the aircraft status indication 124. The specific enumeration of ranges, numerical values, average magnitudes, and the like are merely as example, as those with skill in the art will readily appreciate that any statistical or numerical analysis may be used to compare the given aircraft status indications 124 with electrical parameters 132 and historical values.

The controller 120 may receive the aircraft status indication 124 and retrieve the expected value range 136 having the lowest average magnitude 140 as a historical value. As one of many possible configurations, the controller 120 may compare the aircraft descent phase 150 with the associated expected value range 136 with the electrical parameter 132 received by the temperature sensing device. In response the electrical parameter 132 being outside of the expected value range 136, the controller 120 may output the uncertainty indication 122.

Figure 3:
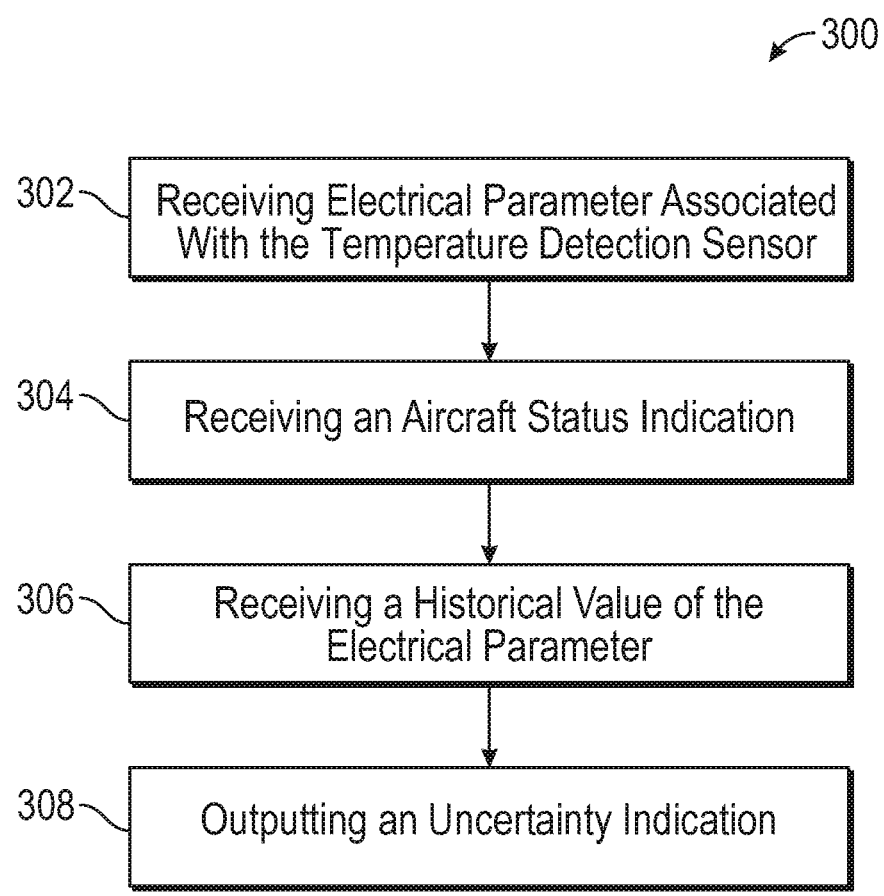
FIG. 3 illustrates a flow diagram of the sequence of operations performed according to one or more embodiment.

Referring to FIG. 3, a flow chart 300 of the sequence of operations performed. The flow chart 300 includes receiving an electrical parameter 132 associated with a temperature sensor 102 in block 302. It should be appreciated that electrical parameter 132 may be received or determined by the controller 120 or another apparatus associated with the controller 120. The electrical parameter 132 may include any numerical value of the electrical parameter 132 or an estimated numerical value of the electrical parameter 132. In block 304, an aircraft status indication 124 is received. The aircraft status indication 124 may be any one or more of information associated with the aircraft 100. The aircraft status indication 124 may be a combination of aircraft information provided to controller 120 or another apparatus. In block 306, a historical value of the electrical parameter 132 is received. The historical value may be an expected value range 136, a function, numerical value, network of values, or statistical analysis of values associated with the aircraft status indication 124 and the electrical parameter 132. In block 308, an uncertainty indication 122 is outputted. The uncertainty indication 122 may be any type of signal or process that is retained or informs operators of the aircraft 100. Such indications may be used to operate the aircraft 100.

The terminology used herein is for the purpose of describing particular implementations only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to one or more example implementations, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular implementation disclosed as the best mode contemplated for carrying out this present disclosure, but that the present disclosure will include all implements falling within the scope of the claims.

What is claimed is:

1. A system for detecting uncertainty in temperature detection systems, comprising:
   a temperature sensor including a ground sheath and a central conductor surrounded by the ground sheath, the ground sheath and the central conductor being electrically coupled to one another through a temperature dependent resistive element;
   a controller connected to the temperature sensor, the controller detecting an electrical parameter of the temperature dependent resistive element, the controller operable upon execution to output an indication when the electrical parameter of the temperature dependent resistive element is not within an expected value range based on an aircraft status indication associated with an aircraft, a historical value of the electrical parameter, and the electrical parameter,
   wherein the electrical parameter is a parameter that that characterizes temperature associated with the temperature sensor, and
   wherein the aircraft status indication is an indication of a flight phase of the aircraft, wherein
   the expected value range has a lowest average magnitude when the flight phase is an aircraft descent phase,
   the expected value range has a lower average magnitude greater than the lowest average magnitude when the flight phase is an aircraft cruise phase,
   the expected value range has a greater average magnitude greater than the lower average magnitude when the flight phase is an aircraft takeoff roll phase,
   the expected value range has a greatest average magnitude greater than the when the flight phase is an aircraft initial climb phase.

2. The system of claim 1, wherein the historical value defines the expected value range based on the aircraft status indication.

3. The system of claim 2, wherein the controller is operable upon execution to output the indication when the electrical parameter is outside of the expected value range associated with the aircraft status indication.

4. The system of claim 1, wherein the aircraft status indication includes a geographical location associated with the temperature sensor.

5. The system of claim 1, wherein the aircraft status indication includes an altitude associated with a geographical location.

6. The system of claim 1, wherein the aircraft status indication includes weather associated with a geographical location.

7. The system of claim 1, wherein the electrical parameter is resistance.

8. A method for detecting uncertainty in temperature detection installations, comprising:
   receiving an electrical parameter associated with a temperature sensor, wherein the electrical parameter is a parameter that that characterizes temperature associated with the temperature sensor;
   receiving an aircraft status indication associated with an aircraft, wherein the aircraft status indication is an indication of a flight phase of the aircraft;
   receiving a historical value of the electrical parameter associated with the aircraft status indication; and
   outputting an indication based on the electrical parameter, the aircraft status indication, and the historical value, wherein the historical value is an expected value range based on the aircraft status indication, and
   wherein
   the expected value range has a lowest average magnitude when the flight phase is an aircraft descent phase,
   the expected value range has a lower average magnitude greater than the lowest average magnitude when the flight phase is an aircraft cruise phase,
   the expected value range has a greater average magnitude greater than the lower average magnitude when the flight phase is an aircraft takeoff roll phase, and
   the expected value range has a greatest average magnitude greater than the when the flight phase is an aircraft initial climb phase.

9. The method of claim 8, wherein outputting the indication is responsive to the electrical parameter being outside of the expected value range.

10. The method of claim 8, wherein the aircraft status indication includes a geographical location of the temperature sensor.

11. The method of claim 8, wherein the aircraft status indication includes an altitude associated with a geographical location.

12. The method of claim 8, wherein the aircraft status indication includes weather associated with a geographical location.

13. The method of claim 8, wherein the electrical parameter is resistance.

* * * * *